United States Patent Office 2,935,527
Patented May 3, 1960

2,935,527
PREPARATION OF ALPHA-HALOALKYL ACIDS

Don N. Gray, Midland, Mich., assignor to The Dow Chemical Company, Midland, Mich., a corporation of Delaware No Drawing. Application June 26, 1957
Serial No. 668,034

8 Claims. (Cl. 260—533)

This invention relates to the preparation of alpha-haloalkyl acids, and more particularly to the preparation of haloalkyl acids by the reaction of an alkene with a nitrosyl halide.

Numerous methods have been disclosed for the preparation of alpha-haloalkyl acids. Most of these methods involve chlorination of the alkyl acid. Thus, the reactants used must be either prepared or obtained at relatively high cost. A method whereby alpha-haloalkyl acids can be prepared from alkenes would be greatly desirable.

It is therefore a principal object of this invention to provide a method for the preparation of alpha-haloalkyl acids. A further object is to provide a method for the preparation of alpha-haloalkyl acids by the reaction of an alkene.

The above and additional objects may be accomplished by intermixing a nitrosyl halide having a molecular weight in the range of 65 to 110, an 1-alkene having from 3 to 6 carbon atoms, and a Friedel-Crafts catalyst at a temperature in the range of 15° to 140° C., and recovering the alpha-haloalkyl acid formed.

The reaction of nitrosyl halide with an alkene is known. In United States Letters Patent No. 2,417,675, a process is disclosed whereby a crystalline bis-propylene nitroso-chloride is obtained by the reaction of ethylene and propylene with nitrosyl chloride. A heavy metal catalyst and a solvent is used. It has been discovered that with propylene and higher alkenes alpha-haloalkyl acids may be obtained when these alkenes are reacted with nitrosyl halide in the presence of a Friedel-Crafts catalyst without a solvent. The mechanism of the reaction is not definitely known. It is believed that when the alkene is intermixed with the nitrosyl halide an intermediate nitroso compound is formed which is converted to the alpha-haloalkyl acid. For example, when the alkene is intermixed with the nitrosyl chloride in the liquid form in the presence of a Friedel-Crafts catalyst, the original brown color of the nitrosyl chloride changes to a greenish-blue color characteristic of the nitroso compounds. Upon heating the mixture the color of the mixture changes from the greenish-blue color to a light yellow with a simultaneous deposition of solid ammonium chloride. In distilling the reacted mixture, the alpha-haloalkyl acid is obtained and a viscous high boiling dark liquid remains which is believed to be a nitrile compound.

Alkenes having from 3 to 6 carbon atoms and the unsaturated bond on the number one carbon atom may be reacted according to the invention with a nitrosyl halide to obtain the alpha-haloalkyl acids. The alkenes may be either straight or branch chain. Illustrative examples of these alkenes are propylene, isobutylene, 1-butylene, 1-amylene, and 1-hexene. Thus with these alkenes, alpha-chloropropionic, alpha-chlorobutyric, alpha-chloroisobutyric, alpha-chlorovaleric, and alpha-chlorocaproic acids may be prepared by the use of nitrosyl chloride and the corresponding alpha-bromo acids with nitrosyl bromide.

In carrying out the reaction, the nitrosyl halide, the alkene, and the catalyst are intermixed with one of the reactants being in liquid phase. With the more volatile alkenes, the nitrosyl halide is generally maintained in the liquid phase and the alkene bubbled into the liquid. For the higher boiling point alkenes, the nitrosyl halide may be gaseous and may be passed into the liquid alkene. The temperature at which the reactants are intermixed is not critical. They may be intermixed at the reaction temperature, but pressurization is required. Thus since the reactants are relatively volatile, a temperature in the range of 0 to −30° C. is generally used. It is preferred to use a low temperature instead of employing pressure equipment and working at pressures above atmospheric. The alkene and the nitrosyl halide are generally intermixed in approximately an equal molar ratio with a slight excess of nitrosyl halide being preferred. After intermixing the reactants at the low temperature, the mixture is heated to a reaction temperature in the range of 15° to 140° C., preferably in the range of 40° to 80° C. The rate of reaction is relatively slow at 15° C. It may require around 10 to 12 hours to complete the reaction at this temperature, while at 140° C. the reaction time may be as short as 15 to 30 minutes. At the preferred temperatures 1 to 2 hours may be required. Since the completion of the reaction is characterized by the changing color of the mixture and the deposition of ammonium chloride, the completion of the reaction may be readily determined by the color or the amount of ammonium chloride precipitated. When the reaction is completed, no further change in color nor additional precipitation of ammonium chloride are obtained.

A small amount of a Friedel-Crafts catalyst is necessary to effect a formation of the alpha-haloalkyl acids. An amount in the range of 0.01 to 3 weight percent, based upon the weight of the reaction mixture, is generally used preferably from 0.1 to 1 weight percent. The formation of the alpha-haloalkyl acids may be effected with an amount smaller than 0.01 weight percent, but the rate of reaction and yields are considerably decreased. Very little beneficial advantage is obtained by increasing the amount of the catalyst over 3 weight percent. Although the Friedel-Crafts catalyst, such as aluminum chloride, stannic chloride, zinc chloride, titanium chloride, ferric chloride, and zirconium tetrachloride may be used, stannic chloride, aluminum chloride and titanium chloride are preferred.

Numerous methods apparent to those skilled in the art may be used to recover the alpha-haloalkyl acid from the reacted mixture. The most convenient method is to distill the mixture at a reduced pressure, such as 20 to 40 millimeters of mercury absolute.

The following example further illustrates the invention but is not to be construed as limiting it thereto.

Example I

To a glass flask equipped with a condenser kept at −78° C., a stirrer, and a glass sparger located at the bottom of the flask, 200 grams of liquid nitrosyl chloride and one gram of stannic chloride were added. The flask and its contents were externally cooled in a bath maintained at −20° C. Propylene was added through the sparger at a rate such that a slight small amount of the propylene was being condensed in the condenser. When approximately stoichiometric amount of propylene had been added, the orange-brown color of nitrosyl chloride had changed to a greenish-blue color. The mixture was removed from the cold bath and allowed to remain at room temperature for approximately 12 hours. In this time the mixture turned from a deep greenish-blue color to light yellow with simultaneous deposition of a white solid. The precipitated solid was removed by filtration and the remaining mixture distilled in a fractionating column at a pressure of about 25 millimeters of mercury absolute. A fraction of 100 grams distilled over at a temperature of 96° to 98° C. This fraction was identified as alpha-chloropropionic acid by means of boiling point temperature, molecular weight, neutral equivalent, and infra-red spectra. The remaining material in the distillation flask was a viscous dark colored liquid which was not identified but believed to be a nitrile compound. The white solid was found to be mainly ammonium chloride containing a small amount of ammonium chlorostannate.

The above run was repeated except that aluminum chloride was used instead of stannic chloride and in another titanium chloride was used instead of stannic chloride as a catalyst. The yields obtained were approximately the same as above.

Also, an additional run using stannic chloride was made where after intermixing the reactants the mixture was heated to 100° C. The reaction was completed in less than one hour.

In the same manner as above, alpha-bromopropionic acid may be prepared by using nitrosyl bromide in place of the nitrosyl chloride. Also other 1-alkenes having from 3 to 6 carbon atoms, such as 1-butylene, 1-amylene, 1-hexene, and isobutylene, may be substituted for the propylene.

What is claimed is:

1. A process for the preparation of alpha-haloalkyl acid, which comprises intermixing a nitrosyl halide having a molecular weight in the range of 65 to 110, an 1-alkene having from 3 to 6 carbon atoms, and a small amount of a Friedel-Crafts catalyst, with at least one of the reactants being in liquid phase, at a temperature in the range of 15° to 140° C. and recovering the alpha-haloalkyl acid formed.

2. A process for the preparation of alpha-haloalkyl acid, which comprises intermixing a nitrosyl halide having a molecular weight in the range of 65 to 100, an 1-alkene having from 3 to 6 carbon atoms, and a small amount of a Friedel-Crafts catalyst, with at least one of the reactants being in liquid phase, at a temperature in the range of 0 to −30° C., heating the resulting mixture to a temperature in the range of 15° to 140° C., and recovering the alpha-haloalkyl acid formed.

3. A process according to claim 2 wherein the resulting mixture is heated to temperature in the range of 40° to 80° C.

4. A process for the preparation of alpha-chloropropionic acid, which comprises intermixing propylene in liquid nitrosyl chloride at a temperature in the range of 0 to −30° C. in the presence of from 0.01 to 3 weight percent of the Friedel-Crafts catalyst, heating the resulting mixture to a temperature in the range of 15° to 140° C., and distilling the heated mixture to recover the alpha-chloropropionic acid.

5. A process for the preparation of alpha-chloropropionic acid, which comprises intermixing propylene in liquid nitrosyl chloride in the presence of from 0.5 to 1 weight percent of a Friedel-Crafts catalyst at a temperature in the range of 0 to −30° C., heating the resulting mixture to a temperature in the range of 40° to 80° C. and distilling the heated mixture to recover the alpha-chloropropionic acid.

6. A process according to claim 5 wherein the Friedel-Crafts catalyst is stannic chloride.

7. A process according to claim 5 wherein the Friedel-Crafts catalyst is aluminum chloride.

8. A process according to claim 5 wherein the Friedel-Crafts catalyst is titanium chloride.

References Cited in the file of this patent

UNITED STATES PATENTS

| | | |
|---|---|---|
| 1,923,630 | Looker et al. | Aug. 22, 1933 |
| 2,417,675 | Beckham | Mar. 18, 1947 |

UNITED STATES PATENT OFFICE

CERTIFICATE OF CORRECTION

Patent No. 2,935,527  May 3, 1960

Don N. Gray

It is hereby certified that error appears in the printed specification of the above numbered patent requiring correction and that the said Letters Patent should read as corrected below.

Column 4, line 2, for "100" read -- 110 --.

Signed and sealed this 29th day of November 1960.

(SEAL)
Attest:

KARL H. AXLINE
Attesting Officer

ROBERT C. WATSON
Commissioner of Patents